US012036663B2

(12) United States Patent
Stenbacka et al.

(10) Patent No.: US 12,036,663 B2
(45) Date of Patent: Jul. 16, 2024

(54) METHOD AND CONTROL ARRANGEMENT FOR DETERMINING A RELATION BETWEEN A ROBOT COORDINATE SYSTEM AND A MOVABLE APPARATUS COORDINATE SYSTEM

(71) Applicant: ABB Schweiz AG, Baden (CH)

(72) Inventors: Michael Stenbacka, Västerås (SE); Miguel Fernandez, Alicante (ES)

(73) Assignee: ABB Schweiz AG, Baden (CH)

( * ) Notice: Subject to any disclaimer, the term of this patent is extended or adjusted under 35 U.S.C. 154(b) by 362 days.

(21) Appl. No.: 17/441,111

(22) PCT Filed: Mar. 25, 2019

(86) PCT No.: PCT/EP2019/057393
§ 371 (c)(1),
(2) Date: Sep. 20, 2021

(87) PCT Pub. No.: WO2020/192882
PCT Pub. Date: Oct. 1, 2020

(65) Prior Publication Data
US 2022/0168902 A1    Jun. 2, 2022

(51) Int. Cl.
*B25J 13/06* (2006.01)
*B25J 9/16* (2006.01)
*G06T 7/73* (2017.01)

(52) U.S. Cl.
CPC ............ *B25J 13/06* (2013.01); *B25J 9/1692* (2013.01); *B25J 9/1697* (2013.01); *G06T 7/73* (2017.01); *G06T 2207/30204* (2013.01)

(58) Field of Classification Search
CPC ........ B25J 13/06; B25J 9/1692; B25J 9/1697; G06T 7/73; G06T 2207/30204;
(Continued)

(56) References Cited

U.S. PATENT DOCUMENTS 4,017,721 A * 4/1977 Michaud ............... G06T 1/0014
348/94
4,712,970 A * 12/1987 Nakamura ............. B25J 19/021
414/730
(Continued)

FOREIGN PATENT DOCUMENTS

CN    104827480 A    8/2015
CN    108481323 A    9/2018
(Continued)

OTHER PUBLICATIONS

Hallenberg, Johan; "Determination of Tool Center Point"; In: "Robot Tool Center Point Calibration using Computer Vision—Master's Thesis in Computer Vision Linkoping Department of Electrical Engineering" Feb. 28, 2007; 14 Pages.
(Continued)

*Primary Examiner* — Bhavesh V Amin
(74) *Attorney, Agent, or Firm* — Whitmyer IP Group LLC (57) ABSTRACT

A method and a control arrangement for determining a relation R↔MA between a robot coordinate system of a robot and an MA coordinate system of a moveable apparatus, the movable apparatus including a sensor device and a localization mechanism configured to localize a sensor coordinate system of the sensor device in the MA coordinate system, wherein a marker is arranged in a fixed relation with a reference location on the robot. The method includes positioning the marker in a plurality of different poses in relation to the robot coordinate system. For each pose of the plurality of different poses, the method includes: determining, on the basis of sensor information, a relation C↔M between the sensor coordinate system and a marker coordinate system; determining a relation MA↔C between the MA coordinate system and the sensor coordinate system; determining a relation R↔E between the robot coordinate system and a reference location coordinate system. The
(Continued)

method also includes determining the relation R↔MA using the relation C↔M, the relation MA↔C, and the relation R↔E, in the plurality of different poses.

18 Claims, 4 Drawing Sheets

(58) Field of Classification Search
CPC . G06T 2207/30244; G06T 7/80; G06F 3/011; G05B 2219/39008; G05B 2219/39451
See application file for complete search history.

(56) References Cited

U.S. PATENT DOCUMENTS

| | | | | |
|---|---|---|---|---|
| 4,755,949 A * | 7/1988 | Shiratori | G05B 19/4015 | 318/632 |
| 4,815,006 A * | 3/1989 | Andersson | B25J 9/1692 | 901/3 |
| 4,831,549 A * | 5/1989 | Red | G05B 19/4182 | 700/254 |
| 4,835,710 A * | 5/1989 | Schnelle | G05B 19/41 | 901/14 |
| 4,837,487 A * | 6/1989 | Kurakake | G05B 19/4147 | 700/5 |
| 4,879,664 A * | 11/1989 | Suyama | G06T 7/73 | 700/186 |
| 4,920,500 A * | 4/1990 | Hetland | B25J 9/02 | 901/3 |
| 4,942,539 A * | 7/1990 | McGee | G06T 7/73 | 348/42 |
| 4,954,762 A * | 9/1990 | Miyake | G05B 19/4182 | 700/190 |
| 5,066,902 A * | 11/1991 | Watanabe | G05B 19/4207 | 901/3 |
| 5,083,073 A * | 1/1992 | Kato | B25J 9/1697 | 700/254 |
| 5,208,763 A * | 5/1993 | Hong | G06V 10/242 | 700/192 |
| 5,220,510 A * | 6/1993 | Araki | G05B 19/4015 | 700/194 |
| 5,297,238 A * | 3/1994 | Wang | B25J 9/1697 | 700/254 |
| 5,412,759 A * | 5/1995 | Yano | G05B 19/4083 | 700/248 |
| 5,444,245 A * | 8/1995 | Kitamura | B82Y 35/00 | 250/307 |
| 5,570,190 A * | 10/1996 | Terawaki | B25J 9/1692 | 356/400 |
| 5,696,673 A * | 12/1997 | Pryor | G05B 19/4097 | 700/279 |
| 5,696,837 A * | 12/1997 | Green | A61B 34/70 | 382/128 |
| 5,802,201 A * | 9/1998 | Nayar | B25J 9/1697 | 700/251 |
| 5,835,693 A * | 11/1998 | Lynch | B25J 9/1605 | 345/473 |
| 5,889,925 A * | 3/1999 | Tsurutani | B25J 9/1687 | 700/250 |
| 5,960,125 A * | 9/1999 | Michael | G06T 7/70 | 700/254 |
| 5,974,169 A * | 10/1999 | Bachelder | G06T 7/12 | 382/199 |
| 5,978,521 A * | 11/1999 | Wallack | G01B 11/275 | 382/294 |
| 6,004,016 A * | 12/1999 | Spector | B25J 9/1666 | 700/255 |
| 6,044,308 A * | 3/2000 | Huissoon | B25J 9/1692 | 700/254 |
| 6,157,873 A * | 12/2000 | DeCamp | B25J 9/1671 | 700/186 |
| 6,236,896 B1 * | 5/2001 | Watanabe | B25J 9/1692 | 700/192 |
| 6,584,378 B1 * | 6/2003 | Anfindsen | G01B 11/002 | 318/568.13 |
| 6,587,752 B1 * | 7/2003 | Saito | B25J 9/1671 | 701/538 |
| 6,594,600 B1 * | 7/2003 | Arnoul | G06T 7/85 | 702/94 |
| 6,615,112 B1 * | 9/2003 | Roos | G01B 21/04 | 700/262 |
| 6,816,755 B2 * | 11/2004 | Habibi | B25J 9/1697 | 901/42 |
| 6,836,702 B1 * | 12/2004 | Brogårdh et al. | B23K 26/0884 | 700/262 |
| 7,218,995 B2 * | 5/2007 | Jahn | G06T 7/75 | 700/192 |
| 7,298,385 B2 * | 11/2007 | Kazi | B25J 9/1671 | 700/254 |
| 7,693,325 B2 * | 4/2010 | Pulla | G01B 9/0205 | 356/138 |
| 7,822,264 B2 * | 10/2010 | Balslev | G06V 10/46 | 382/154 |
| 7,852,355 B2 * | 12/2010 | Friedrich | G06F 3/012 | 345/632 |
| 7,957,583 B2 * | 6/2011 | Boca | G06T 7/75 | 382/154 |
| 8,095,237 B2 * | 1/2012 | Habibi | B25J 9/1692 | 318/568.13 |
| 8,224,024 B2 * | 7/2012 | Foxlin | G06T 7/73 | 348/169 |
| 8,452,080 B2 * | 5/2013 | Engedal | G06T 7/75 | 382/154 |
| 8,494,677 B2 * | 7/2013 | Mizutani | G05B 19/423 | 700/250 |
| 9,268,406 B2 * | 2/2016 | Geisner | H04N 13/344 | |
| 9,898,833 B1 * | 2/2018 | Jankevics | G06T 7/62 | |
| 9,916,506 B1 * | 3/2018 | Davis | G06V 10/22 | |
| 9,969,090 B2 * | 5/2018 | Warashina | B25J 9/1697 | |
| 10,033,985 B2 * | 7/2018 | Engedal | G06T 7/251 | |
| 10,177,183 B2 * | 1/2019 | Lund | H01L 27/14605 | |
| 10,504,231 B2 * | 12/2019 | Fiala | G06V 20/20 | |
| 10,507,578 B1 * | 12/2019 | Linnell | B25J 9/10 | |
| 10,543,599 B2 * | 1/2020 | Kamoi | B25J 9/1697 | |
| 10,664,996 B2 * | 5/2020 | Hamadou | H04N 23/69 | |
| 10,671,240 B2 * | 6/2020 | Gildert | G06T 19/006 | |
| 10,676,022 B2 * | 6/2020 | Zevenbergen | G01C 21/3461 | |
| 11,004,213 B2 * | 5/2021 | Lee | G06T 7/136 | |
| 11,267,153 B2 * | 3/2022 | Rivers | G05B 19/4069 | |
| 11,353,326 B2 * | 6/2022 | Fink | G05D 1/0217 | |
| 11,400,602 B2 * | 8/2022 | Katagiri | B25J 9/1664 | |
| 11,478,936 B2 * | 10/2022 | Tsukabe | B25J 13/088 | |
| 11,537,832 B2 * | 12/2022 | Nayak | G06K 7/1417 | |
| 11,660,755 B2 * | 5/2023 | Matthias | B25J 9/1676 | 700/255 |
| 11,745,341 B2 * | 9/2023 | Gillespie | B25J 13/085 | 700/245 |
| 2002/0082498 A1 * | 6/2002 | Wendt | G16H 40/67 | 348/E13.059 |
| 2002/0154128 A1 * | 10/2002 | Zachmann | B25J 9/1664 | 345/474 |
| 2003/0012410 A1 * | 1/2003 | Navab | G06V 10/147 | 382/103 |
| 2003/0202691 A1 * | 10/2003 | Beardsley | G06T 7/85 | 382/296 |
| 2004/0104935 A1 * | 6/2004 | Williamson | G06V 10/10 | 715/757 |
| 2004/0172164 A1 * | 9/2004 | Habibi | G06T 1/0007 | 700/245 |
| 2004/0189631 A1 * | 9/2004 | Kazi | G06T 19/006 | 345/418 |
| 2005/0159842 A1 * | 7/2005 | Ban | B25J 19/023 | 702/150 |
| 2005/0251290 A1 * | 11/2005 | Skourup | G05B 19/42 | 700/245 |
| 2005/0273202 A1 * | 12/2005 | Bischoff | B25J 9/1692 | 700/263 |
| 2006/0023938 A1 * | 2/2006 | Ban | B25J 9/1692 | 382/153 |

(56) References Cited

U.S. PATENT DOCUMENTS

| | | | | |
|---|---|---|---|---|
| 2007/0073439 | A1* | 3/2007 | Habibi | G05B 19/4182 700/213 |
| 2007/0081695 | A1* | 4/2007 | Foxlin | G06T 7/73 382/103 |
| 2008/0150965 | A1* | 6/2008 | Bischoff | G06T 7/70 382/312 |
| 2010/0161125 | A1* | 6/2010 | Aoba | G05B 19/401 700/254 |
| 2011/0169861 | A1* | 7/2011 | Suzuki | G06T 7/75 345/632 |
| 2011/0288964 | A1* | 11/2011 | Linder | B25J 9/1697 700/275 |
| 2011/0313734 | A1* | 12/2011 | Grosch | G06F 3/0325 703/1 |
| 2012/0265342 | A1* | 10/2012 | Kumiya | B25J 9/1676 700/255 |
| 2014/0118339 | A1* | 5/2014 | Davies | G06T 7/80 345/419 |
| 2014/0200863 | A1* | 7/2014 | Kamat | E02F 9/245 703/1 |
| 2014/0288710 | A1* | 9/2014 | Ikenaga | B25J 9/1692 901/47 |
| 2014/0368542 | A1* | 12/2014 | Tawara | G06T 19/006 345/633 |
| 2016/0277887 | A1* | 9/2016 | Grohmann | A47L 11/4011 |
| 2017/0075116 | A1* | 3/2017 | Gardiner | G02B 27/017 |
| 2017/0199299 | A1* | 7/2017 | Braune | H04L 67/12 |
| 2018/0005446 | A1* | 1/2018 | Elazary | G06T 7/70 |
| 2018/0144459 | A1* | 5/2018 | Hamadou | B25J 9/1666 |
| 2018/0144503 | A1* | 5/2018 | Hamadou | H04N 23/69 |
| 2019/0039242 | A1* | 2/2019 | Fujii | G05B 19/19 |
| 2019/0061167 | A1* | 2/2019 | Yoshino | B25J 13/06 |
| 2019/0389066 | A1* | 12/2019 | Jung | B25J 9/163 |
| 2020/0034621 | A1* | 1/2020 | Ooba | G05B 19/042 |
| 2020/0164518 | A1* | 5/2020 | Lager | B25J 9/1697 |
| 2020/0316780 | A1* | 10/2020 | Rostrup | B25J 9/1692 |
| 2021/0021797 | A1* | 1/2021 | Miyoshi | H04N 13/344 |
| 2022/0024037 | A1* | 1/2022 | Lee | B25J 13/08 |

FOREIGN PATENT DOCUMENTS

| | | |
|---|---|---|
| CN | 109313417 A | 2/2019 |
| EP | 2728548 A2 | 5/2014 |
| EP | 2728548 A3 | 11/2017 |
| EP | 3428760 A1 | 1/2019 |
| JP | H06259119 A | 9/1994 |

OTHER PUBLICATIONS

Ameri, A. E. et al.; "Augmented Reality Meets Industry: Interactive Robot Programming"; Malardalen University, Sweden, SIGRAD 2010; 4 Pages.

Grossmann, Bjarne, et al.; "Continuous hand-eye calibration using 3D points"; 2017 IEEE International Conference on Industrial Informatics (INDIN); Emden, Germany; Jul. 24, 2017; 8 Pages.

Blaga, Andreea, et al.; "Augmented Reality for Digital Manufacturing"; 2018 26th Mediterranean Conference on Control and Automation (MED), IEEE; Jun. 19, 2018; 6 Pages.

Pachtrachai, Krittin, et al.; "CHESS Calibrating the Hand-Eye Matrix With Screw Constraints and Synchronization"; IEEE Robotics and Automation Letters, vol. 3, No. 3, Jul. 2018; Date of Publication: Jan. 31, 2018; 8 Pages.

International Search Report and Written Opinion of the International Searching Authority; Application No. PCT/EP2019/057393; Completed: Dec. 6, 2019; Mailing Date: Dec. 13, 2019; 21 Pages.

Chinese Office Action; Application No. 2019800942776; Completed: Oct. 16, 2023; Issued: Oct. 18, 2023; 7 Pages.

\* cited by examiner

METHOD AND CONTROL ARRANGEMENT FOR DETERMINING A RELATION BETWEEN A ROBOT COORDINATE SYSTEM AND A MOVABLE APPARATUS COORDINATE SYSTEM

TECHNICAL FIELD

The present disclosure relates to technology related to calibration, and in particular to technology for relating a robot coordinate system and a moveable apparatus coordinate system.

BACKGROUND

Robots have historically been used in industry for performing same kind of tasks. However, with new applications the demand for simplified user interfaces for programming and controlling robots has become an issue to increase the usability.

Augmented reality (AR) provides a simplified and intuitive framework for controlling robots. AR is a term used for overlaying computer-generated graphics, text and three dimensional (3D) models on real world objects through a display or on a video stream. Virtual information is embedded onto an image or display of the real world, thereby augmenting the image or display with additional information. By means of AR, the user can ask the robot to perform an operation, and as a response get the robot's simulated plan for performing the operation, see for example "Augmented Reality Meets Industry: Interactive Robot Programming", A. Ameri E et al, Malardalen University, Sweden, SIGRAD 2010.

An AR apparatus may comprise a camera, a display, a localization mechanism and a processor. In order to use the AR apparatus together with a robot, they need to be calibrated together. This calibration is commonly made by manually adjusting the coordination systems visually in three-dimensional space. However, it is difficult to gain sufficient accuracy with such a manual method.

US20180144503A1 discloses a method for calibrating a robot system using an AR system and a plurality of optical markers. The coordinates of the optical markers are arranged in the environment of the robot at known positions, and the Tool Centre Point (TCP) of the robot is moved to the markers. A visual marker is assigned to an optical marker, and a position of the visual marker is obtained by transforming the position of the optical marker into the coordinate system of the camera. A check is performed if the optical marker and the assigned virtual marker overlay each other. If not, the calibration is not correct, and the robot has to be calibrated again to the optical markers. This method requires a skilled user that can evaluate if the robot is correctly calibrated or not, and it might also be hard to gain sufficient accuracy with this method.

SUMMARY

It is thus an objective of the disclosure to alleviate at least some of the drawbacks with the prior art. It is a further objective to provide a reliable and easy-to-use method that relates a coordinate system of a robot and a coordinate system of a movable apparatus, MA, for example a movable AR apparatus, to each other.

These objectives and others are at least partly achieved by the method and the control arrangement according to the independent claims, and by the embodiments according to the dependent claims.

According to a first aspect, the disclosure relates to a method for determining a relation R$\leftrightarrow$MA between a robot coordinate system of a robot and a MA coordinate system MA of a moveable apparatus. The movable apparatus comprises a sensor and a localization mechanism configured to localize a sensor coordinate system of the sensor in the MA coordinate system. A marker is arranged in a fixed relation with a reference location on the robot. The method comprises positioning the marker in a plurality of different poses in relation to the robot coordinate system. For each pose of the plurality of different poses, the method comprises determining, on the basis of sensor information, a relation C$\leftrightarrow$M between the sensor coordinate system and a marker coordinate system, determining a relation MA$\leftrightarrow$C between the MA coordinate system MA and the sensor coordinate system, and determining a relation R$\leftrightarrow$E between the robot coordinate system and a reference location coordinate system. The method further comprises determining the relation R$\leftrightarrow$MA using the relation C$\leftrightarrow$M, the relation MA$\leftrightarrow$C, and the relation R$\leftrightarrow$E, in the plurality of different poses.

With the method, the robot and the movable apparatus can be calibrated together without any need of manual steps or human interaction. The method can be performed without specially trained robot technicians, and thus provides a user-friendly method for calibration. The robustness and accuracy of the calibration may be enhanced compared to methods that rely on human interaction.

According to some embodiments, the determining the relation R$\leftrightarrow$MA comprises obtaining a relation MA$\leftrightarrow$M between the MA coordinate system and the marker coordinate system, by using the relation MA$\leftrightarrow$C and the relation C$\leftrightarrow$M. Thereby, the problem can be formulated with an equation on the form AX=YB.

According to some embodiments, a relation E$\leftrightarrow$M between the reference location coordinate system and the marker coordinate system is unknown at the beginning of the method. Thus, there is no need to have a predetermined position of the marker on the robot.

According to some embodiments, the marker coordinate system is immobile in relation to the reference location coordinate system.

According to some embodiments, the method comprises to automatically performing the steps of the method. Thus, there is no need for human interaction in order to perform the calibration.

According to some embodiments, the moveable apparatus is a moveable augmented reality, AR, apparatus. Thus, the MA coordinate system is a coordinate system of an augmented reality apparatus, thus an augmented reality (AR) coordinate system.

According to some embodiments, the sensor is a camera sensor, and wherein the method comprises capturing an image of the marker, wherein the sensor information comprises image information from the captured image. Thus, thereby image analysis may be used to identify the reference location in the image.

According to some embodiments, the movable apparatus comprises a display, and wherein the method comprises using the determined relation for projecting augmented information related to the robot on the display. Thus, once the relation is known, the movable apparatus and the robot can be used together. The method makes it possible to efficiently start creating robot based augmented reality content and applications.

According to some embodiments, the plurality of different poses comprises at least three different poses with a movement in between the poses, wherein each movement's rotation axis is non-parallel to the previous one(s). Thus, sufficient data for determining the relation R↔MA can be collected, as the orientations are different from each other.

According to a second aspect, the disclosure relates to a control arrangement for determining a relation R↔MA between a robot coordinate system of a robot and a MA coordinate system of a moveable apparatus. The movable apparatus comprises a sensor and a localization mechanism configured to localize a sensor coordinate system of the sensor in the MA coordinate system. A marker is arranged in a fixed relation with a reference location on the robot. The control arrangement is configured to position the marker in a plurality of different poses in relation to the robot coordinate system. The control arrangement is configured to, for each pose of the plurality of different poses: determine, on the basis of sensor information, a relation C↔M between the sensor coordinate system and a marker coordinate system, determine a relation MA↔C between the MA coordinate system MA and the sensor coordinate system, and to determine a relation R↔E between the robot coordinate system and a reference location coordinate system. The control arrangement is also configured to determine the relation R↔MA using the relation C↔M, the relation MA↔C, and the relation R↔E in the plurality of different poses.

According to a third aspect, the disclosure relates to a movable apparatus for determining a relation R↔MA between a robot coordinate system of a robot and a MA coordinate system of the movable apparatus. The movable apparatus comprises a sensor and a localization mechanism configured to localize a sensor coordinate system of the sensor in the MA coordinate system. A marker is arranged in a fixed relation with a reference location on the robot, and the movable apparatus further comprises a control arrangement according to the second aspect. Thus, the movable apparatus may determine the relation R↔MA independently.

According to some embodiments, the movable apparatus is configured to obtain the relation R↔E from a robot controller of the robot.

According to a fourth aspect, the disclosure relates to a system for determining a relation R↔MA between a robot coordinate system of a robot and a MA coordinate system of the moveable apparatus. The system comprises a robot with a marker arranged in a fixed relation with a reference location on the robot. The system also comprises a movable apparatus comprising a sensor and a localization mechanism configured to localize a sensor coordinate system of the sensor in the MA coordinate system. The system further comprises a control arrangement according to the second aspect.

According to a fifth aspect, the disclosure relates to a computer program comprising instructions to cause the control arrangement according to the second aspect to execute the first aspect.

According to a sixth aspect, the disclosure relates to a computer-readable medium having stored thereon, the computer program of the fifth aspect.

DETAILED DESCRIPTION

A robot may use the vision of a camera to localize objects, for example in pick-and-place operations. The robot and the camera then have to be calibrated together, such that the robot knowns where an object, located by the camera, is in the coordinate system of the robot. Thus, the robot and the camera have to be spatially synchronized. The camera may be mounted on the robot hand, or it may be a camera that is attached to the environment. The problem of determining the relationship between the robot and the camera is referred to as a hand-eye calibration problem. Most solutions to this problem attempt to solve an equation of the form AX=YB (or A'Y=YB' or A"X=XB"). However, if the camera is movable and free-standing from the robot, it becomes more problematic to enable automatic calibration of the robot and the camera.

The following disclosure presents a solution for determining a relation between a robot coordinate system and a MA coordinate system, such that a calibration can be performed automatically. The solution makes use of a localization mechanism of the movable apparatus, that enables the movable apparatus to localize itself in the real world. Thereby it is not necessary that the movable apparatus has a fixed location in the real world, instead, a user wearing the movable apparatus may walk around while calibration is performed, lay down the movable apparatus and pick it up again, all during the same calibration. Thereby also an untrained user may easily relate the movable apparatus to the robot.

Figure 1:
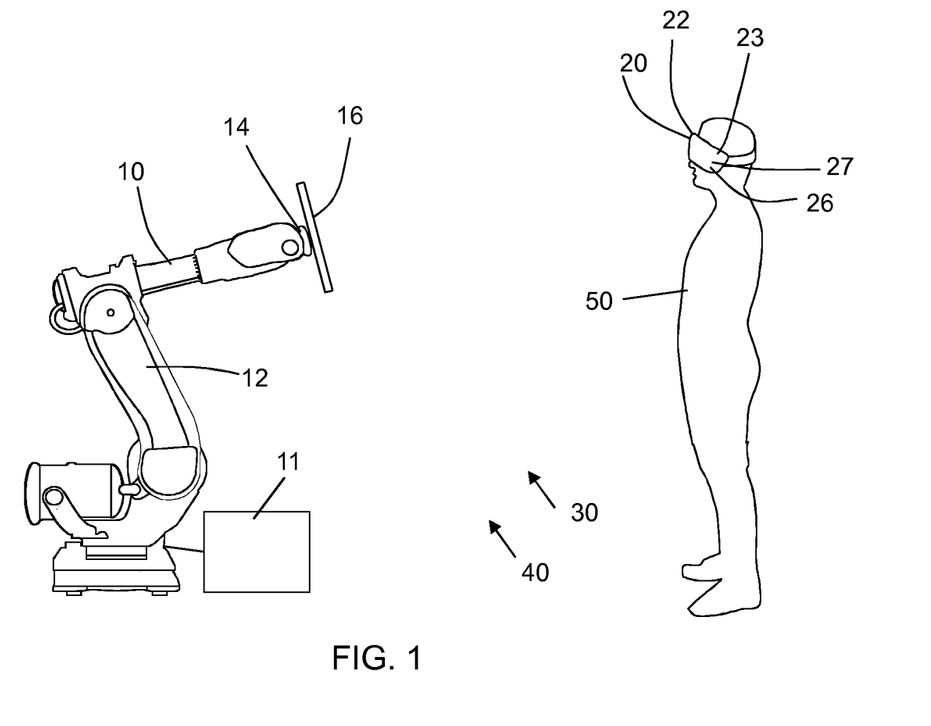
FIG. 1 illustrates a robot comprising a marker, and a person wearing an AR-headset.

FIG. 1 illustrates a system 40, where the method for determining a relation may be performed. The system 40 comprises a robot 10, a movable apparatus 20, here arranged to a head of a person 50, and a control arrangement 30.

The robot 10 is a programmable robot comprising a robot controller 11 and a robot arm 12. The robot 10 is here a six-axis robot, but the method may be implemented with any kind of reprogrammable robot that has at least five axes. For example, the robot may be a seven-axis robot. The robot 10 may be an industrial robot. An industrial robot is herein defined to be an automatically controlled, reprogrammable, multipurpose manipulator programmable in three or more axes. The robot arm 12 includes a kinematic chain including a plurality of links and joints. The last link or wrist of the robot 10 has a mechanical interface where an end-effector can be attached. A working point of the end-effector represents a tool center point (TCP). The TCP is the point in relation to which robot positioning typically is defined. Thus, normally the TCP coordinate system is set in relation to the robot coordinate system R. The TCP will be jogged or moved to the programmed target positions, e.g. different poses, including a position and an orientation of the TCP. The TCP is normally defined in relation to a turning disc of the mechanical interface of the robot 10. In FIG. 1, a marker 16 is attached to the mechanical interface. The robot controller 11 is configured to control movements of the robot arm 12 by controlling a plurality of electrical motors on the robot arm 12. The robot controller 11 is configured to execute instructions of a computer program running on the robot controller 11, or execute externally received instructions, wherein the robot arm 12 is moved to a plurality of different poses. A drive unit (not shown) is configured to control the electrical motors of the robot arm 12 in dependence of the executed instructions. The robot controller 11 operates in a robot coordinate system R. The robot controller 11 is further configured to measure or determine the pose in the robot coordinate system R of a reference location coordinate system E, which may be any of the coordinate systems defined by the links of the robot arm 12, using angular position measurements of the joints of the robot arm 12 and a kinematic model of the robot 10.

The movable apparatus 20 is in FIG. 1 pictured as a head-mounted display or headset configured for augmented reality (AR). The head-mounted display is for example a HoloLens from Microsoft, Magic Leap goggles, Meta 2 from the Meta Company, Mira Prism, to name a few. AR may also be referred to as mixed reality. Alternatively, the movable apparatus 20 is a smartphone, a tablet or other kind of computer, or a combination thereof. In the movable apparatus 20, 3D computer-generated imaginary is superimposed over real world objects. Thus, in some embodiments, the moveable apparatus 20 is a moveable AR apparatus. The movable apparatus 20 comprises a sensor device 22, a display 23, a localization mechanism 26 and control circuitry 27. The sensor device 22 typically comprises a sensor array and some control circuitry. The sensor device 22 is an electronic device that converts e.g. light received to the movable apparatus 20 (e.g. by a lens, not shown) into an electrical signal comprising sensor information. The electrical signal is converted into a digital image using control circuitry, for example the control circuitry included in the sensor device 22. The sensor device 22 is for example a Charge Couple Device (CCD), a Complementary metal oxide semiconductor (CMOS), or other kind of camera sensor of a two-dimensional (2D) or three-dimensional (3D) camera. The sensor device 22 may alternatively be a lidar sensor device, a radar sensor device or an ultrasonic sensor device comprising an array or ultrasonic sensors. Thus, any kind or sensor device 22 that is capable of detecting sensor information that can be used for determining the pose of the marker 16 relative to the sensor(s) of the sensor device 22. The control circuitry 27 is configured to process the electrical signal or the digital image, e.g. comprising sensor information of the marker 16, such that the marker 16 is recognized. This is e.g. done using object or image recognition techniques. In alternative sensor technologies, the sensor device 22 may be an electronic device that detects sounds or magnetic fields etc. The control circuitry 27 is also configured to determine a pose of the marker 16 in a sensor coordinate system C of the sensor device 22. The pose of the marker 16 in the sensor coordinate system C is for example detected using a pose estimation algorithm from a planar target. For example, solving a perspective n-point problem, as known to the skilled in the art. In other words, to calculate the pose of the marker 16 in 3D space based on one or several 2D images. Alternatively, the sensor information of the marker 16 is compared with a saved copy of the marker 16. It is desired to get enough information to estimate a pose of the marker 16, including orientation and position. It may be assumed that the sensor coordinate system C has been intrinsically calibrated, and thus that the intrinsic parameters of the sensor device 22, such as focal length in terms of pixels, scale factors etc., are known. The intrinsic parameters allow a mapping between rays and pixels in the digital image or electrical signal. In case of several sensors in the sensor device, the intrinsic parameters also include the relation between the lenses. If the sensor device 22 is a 3D camera, the pose of the marker 16 may be determined from three to four 3D-points. If lidar or radar is used, the marker 16 may be of a material that is easily detectable by the lidar or radar, and the pose of the marker 16 determined from the reflected light or other radiation.

The movable apparatus 20 defines a movable apparatus (MA) coordinate system MA, for example by constructing a map of the environment, using the localization mechanism 26. That is, the MA coordinate system MA shall not be confused to be fixed in relation to the movable apparatus 20 (like the sensor coordinate system C), but the MA coordinate system MA can merely be considered as a coordinate system fixed in relation to the surrounding environment as perceived by the movable apparatus 20. The movable apparatus 20 may use a simultaneous localizing and mapping (SLAM) based method for constructing a map of the environment that defines the MA coordinate system MA, and also to localize itself in the MA coordinate system MA. The movable apparatus 20 may include one or several other optical sensors such as one-dimensional (1D) or two-dimensional (2D) rangefinders, 3D high definition lidar, 3D flash lidar, 2D or 3D sonar sensors and/or one or more 2D cameras. SLAM typically make use of a plurality of such sensors. Commercially available AR apparatuses contain localization mechanisms 26 configured to localize the sensor coordinate system C in the MA coordinate system MA, even if the details of how these localization mechanisms 26 deduce the information are not necessarily known to the user. For the purposes of the present invention it can therefore be assumed that the relation between the MA coordinate system MA and the sensor coordinate system C is known.

FIG. 1 also illustrates a control arrangement 30 for controlling the different parts of the system 40. The control arrangement 30 comprises one or several of control circuitry 27 in the movable apparatus 20, the robot controller 11, or an external computer (not shown) connected to the robot controller 11 or movable apparatus 20.

Figure 2:
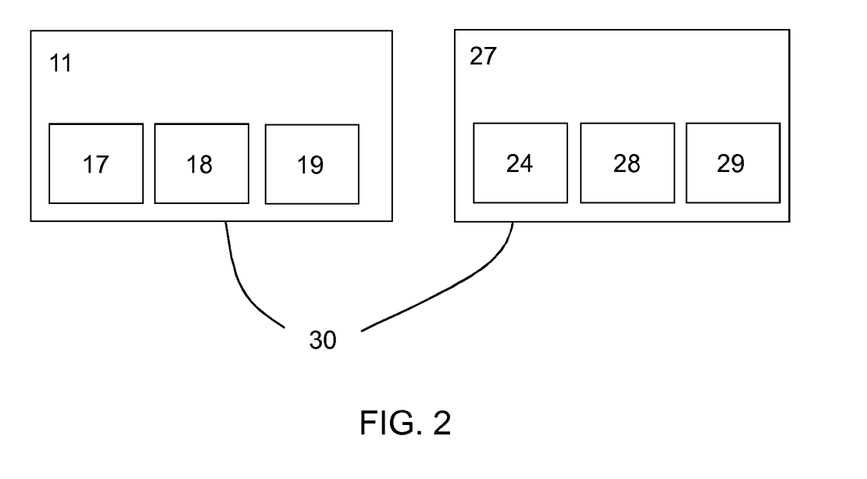
FIG. 2 illustrates a control arrangement according to some embodiments.

FIG. 2 illustrates the robot controller 11 and control circuitry 27 of the movable apparatus 20 in more detail, according to some embodiments. The robot controller 11 comprises a processor 17, a memory 18 and a communication interface 19. The control circuitry 27 comprises a processor 24, a memory 28 and a communication interface 29. A processor comprises, for example, one or several central processing units. A memory comprises, for example, one or several memory units. A communication interface is configured for sending and receiving information wirelessly, or by wire.

The robot 10 is able to perform work in a 3D space around the robot 10 referred to as the work space of the robot 10. The work space is defined to be the total volume swept out by the end-effector as the robot 10 executes all possible motions.

In the following, a method for determining a relation R↔MA between a robot coordinate system R of the robot 10 and a MA coordinate system MA of the moveable apparatus 20, will be explained. The method is for example implemented as a computer program comprising instructions, that makes one or several parts of the system 40 act according to the instructions, in order to accomplish the method, when executing the computer program. The computer program may for example be loaded into the memory 28 of the movable apparatus 20, and/or the memory 18 of the robot controller 11 and/or a memory of an external computer connected to the movable apparatus 20 and the robot controller 11. Still alternatively, the computer program may be distributed between several of the movable apparatus 20, the robot controller 11 and the external computer. The robot controller 11 and the movable apparatus 20 (and optionally the external computer) communicate in order to accomplish the method, that is to communicate data and information such as relations, poses etc.

In order to perform the method, the sensor device 22 of the movable apparatus 20 should be located such that it can capture or record information of the marker 16, for example, the marker 16 should be visible in the field of view of the sensor device 22. The movable apparatus 20 is typically carried by a human, e.g. on one's head, or held in the hands of the user. By looking at the robot 10 through a display of the movable apparatus 20 and making sure the marker 16 can be seen, the method can be performed. Alternatively, it is included in the method to determine a suitable marker 16 of the robot 10. A detail of the robot 10 may then be selected as being suitable to be a marker 16 by an object recognition algorithm. A suitable marker is a marker which pose can be detected. Thus, the position and the orientation of the marker 16 should be detectable. Typically, a marker 16 should allow four different points of the marker 16 to be distinguished by the sensor device 22. However, the different points do not have to be points per se, for example, a line may give two different points. Thus, the marker 16 should have distinguishable features such as points, lines, circles or other geometric primitives and/or distinguishable patterns.

Figure 3:
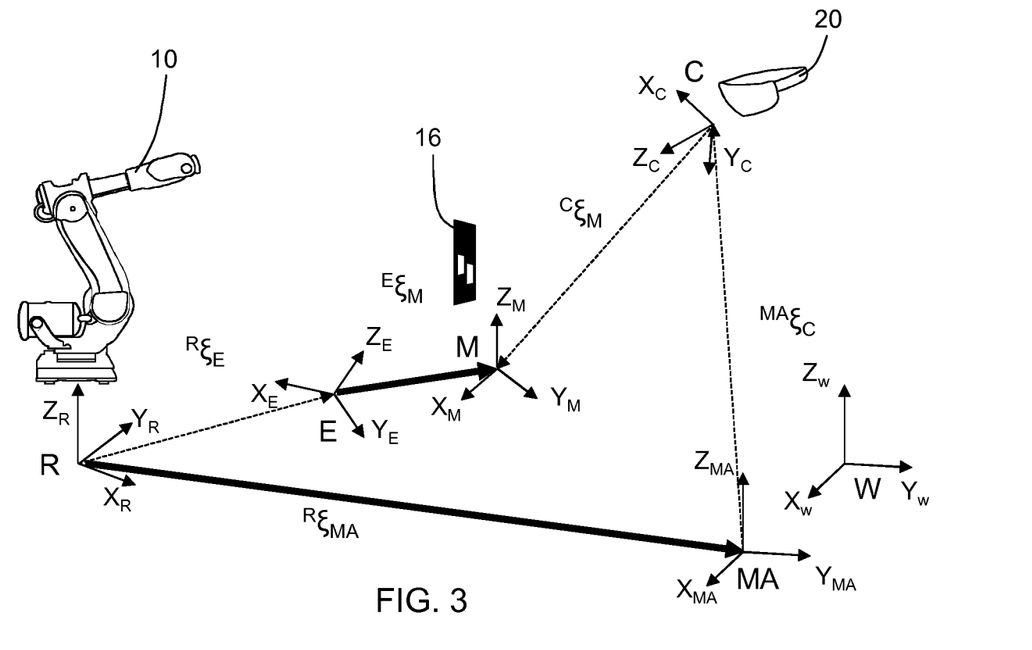
FIGS. 3-5 illustrate relations between coordinate systems for modeling a problem for determining a relation between a robot coordinate system and a movable apparatus coordinate system.
Figure 4:
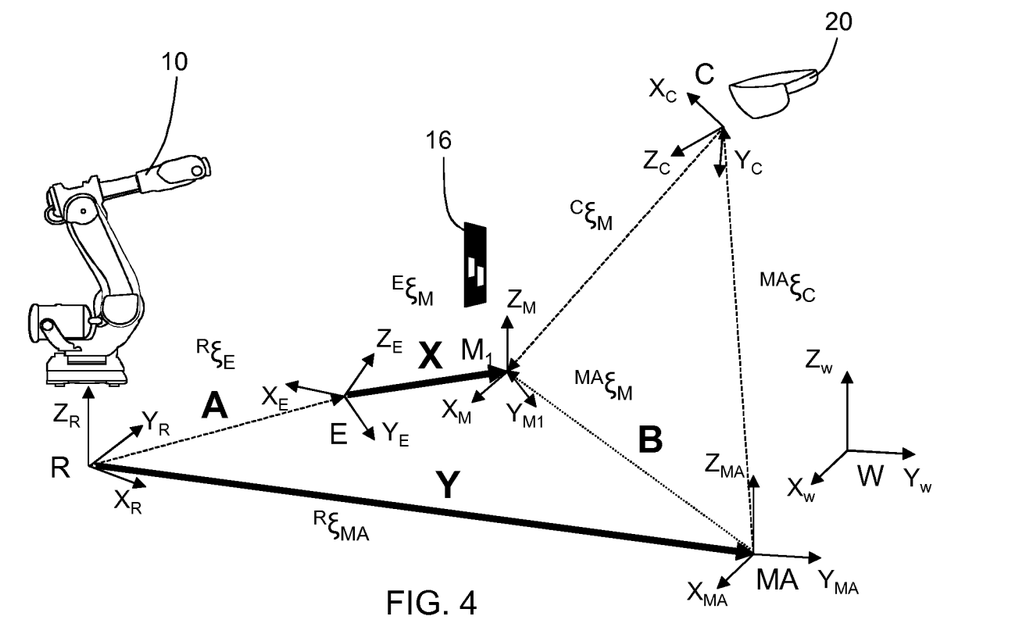
Figure 5:
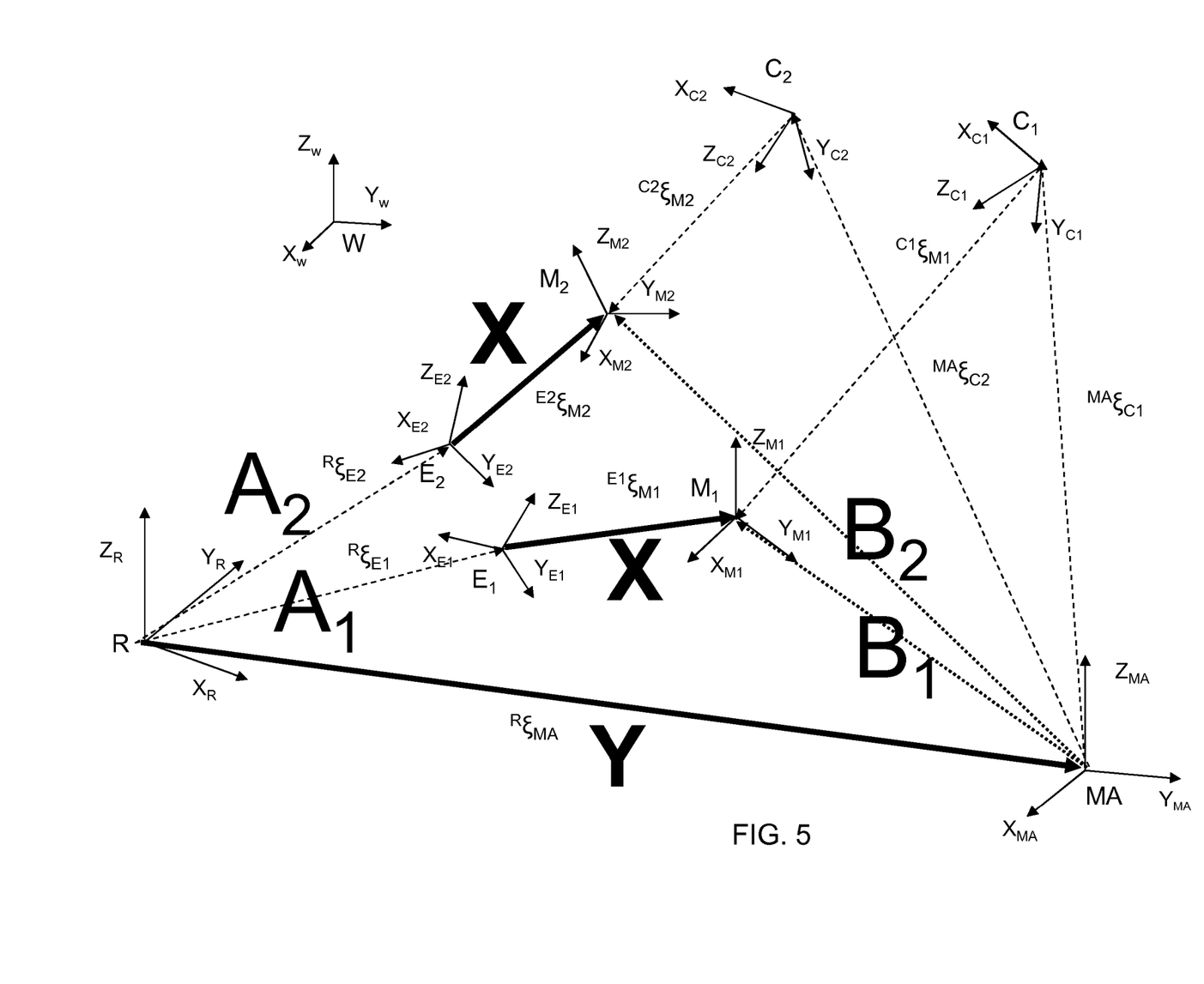
Figure 6:
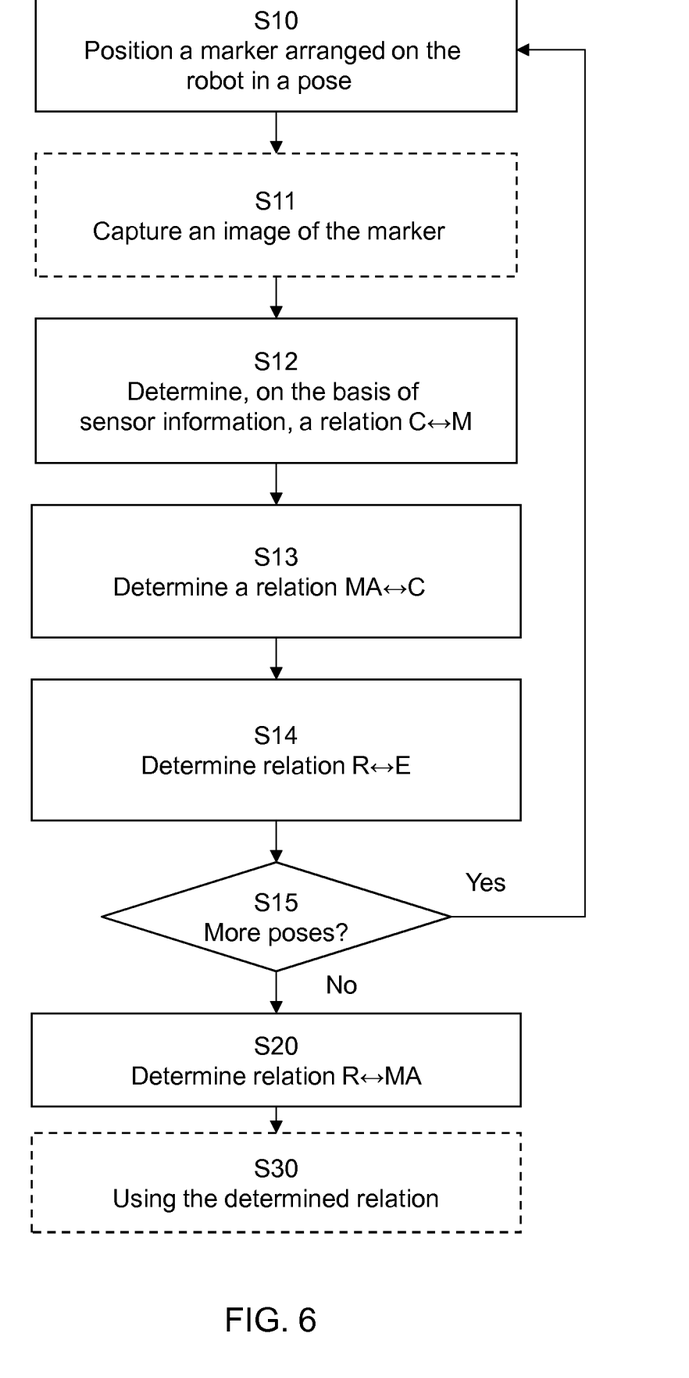
FIG. 6 illustrates a flow chart of a method according to some embodiments.

The method will be explained with reference to the flow chart of FIG. 6, and to the FIGS. 3-5. FIGS. 3-5 illustrate coordinate systems of the different parts of the system 40, and relations between the coordinate systems. The coordinate systems, or some of them, and relations between them, are here used for modeling the problem of determining the relation R↔MA. As illustrated in the figures, the base of the robot 10 is the link zero and represents the robot coordinate system R with the axes $X_R$, $Y_R$, $Z_R$ with origin $O_R$. Thus, the robot coordinate system R is typically the base coordinate system of the robot 10. Typically, the robot coordinate system R is defined to coincide with a world coordinate system W. The world coordinate system W is for example defined by the user, and the Z-axis is collinear but in the opposite direction to the acceleration of gravity vector. The robot coordinate system R is normally defined by the robot manufacturer. The robot 10 is arranged with at least one reference location 14. The reference location 14 is for example the TCP of the robot, and the reference location coordinate system E is then the TCP coordinate system. However, the reference location 14 may alternatively be another reference location that has a known relation to the robot coordinate system R. The reference location 14 may be located on a link on the robot 10 that gives enough degrees of freedom to execute the calibration, e.g. the link of axis 6 or 7 (if present), with corresponding coordinate systems that are known in the robot coordinate system R. The reference location 14 represents a reference location coordinate system E with the axes $X_E$, $Y_E$, $Z_E$ with origin $O_E$ on the robot 10.

The marker 16 is arranged in a fixed relation with the reference location 14 on the robot 10. Thus, the relation between the marker 16 on the robot 10 and the reference location 14 of the robot 10 does not change. The marker 16 does not need to be attached exactly on the robot 10, e.g. on the end-effector. The only requirement is that there is a constant relation (distance and orientation) between the marker 16 and the link it is attached to during the calibration phase. However, the fixed relation may be unknown. The marker 16 represents a marker coordinate system M with the axes $X_M$, $Y_M$, $Z_M$ with origin $O_M$. The marker coordinate system M is immobile in relation to the reference location coordinate system E. If the reference location coordinate system E is the TCP coordinate system, then the marker coordinate system M is immobile in relation to the TCP of the robot 10. In other words, the marker coordinate system M continuously has a fixed relation to the reference location coordinate system E, that will not change when the pose of the robot 10 is changed. The marker 16 may be a dedicated marker attached to the robot 10, a detail of a tool (not shown) or a detail of the robot 10 itself (especially a detail of an end part of the robot 10). The marker 16 is for example a fiducial marker that will appear in a produced image of the marker 16, and that can be used as a reference. For example, the marker 16 is an ArUco marker (a synthetic square marker composed by a wide black border and an inner binary matrix which determines its identifier, id), a Cybercode marker (a visual tagging based on 2D barcode technology), an ARTag marker etc. The marker 16 may be especially designed or selected to be easily read or detected by the sensor device 22 and control circuitry 27 of the movable apparatus 20.

The sensor device 22 of the movable apparatus 20 defines a sensor coordinate system C with the axes $X_C$, $Y_C$, $Z_C$ with origin $O_C$. The localization mechanism 26 of the movable apparatus 20 is configured to localize the sensor coordinate system C in the MA coordinate system MA. The movable apparatus 20 defines the MA coordinate system MA, for example by constructing a map of the environment, using the localization mechanism 26, as previously explained. The MA coordinate system MA has the axes $X_{MA}$, $Y_{MA}$, $Z_{MA}$. The MA coordinate system MA typically does not move in relation to the real environment or real world and can thus be seen as being attached or fixed to the real world. However, the relation between the MA coordinate system MA and the real world may be continuously adjusted as more information is obtained from this relation. The real world may be defined by the world coordinate system W, with the axes $X_W$, $Y_W$, $Z_W$ with origin $O_W$. The MA coordinate system MA is for example an augmented reality (AR) coordinate system. Typically, the robot coordinate system R also does not move in relation to the real world. Thus, the MA coordinate system MA has a fixed relation to the robot coordinate system R (over time).

The described coordinate systems may be Cartesian coordinate systems defined with the orthogonal right-hand rule. Alternatively, the described coordinate systems may be defined with the orthogonal left-hand rule. The rotation in a coordinate system can be represented by three independent parameters, two angles u and v to define the rotation axis k, and an angle θ to specify the amount of rotation. Angle u is e.g. in the X-Y-plane, and angle v is the inclination from the Z-axis. The position and rotation of the reference location e.g. the TCP is typically defined in the robot coordinate system R by appropriate transformation between the coordinate systems.

In the FIGS. 3-5, the modelling of the problem is visualized. By following the arrows in the figures between the coordinate systems, we build the main hand-eye equation. In the FIGS. 3-4, $^R\xi_E$ refers to the transformation from R to E; $^E\xi_M$ refers to the transformation from E to M; $^C\xi_M$ refers to the transformation from C to M; $^{MA}\xi_C$ refers to the transformation from MA to M; and $^R\xi_{MA}$ refers to the transformation from R to MA. In FIG. 3, by following the arrows, we get the relation:

$$^R\xi_E {}^E\xi_M = {}^R\xi_{MA} {}^{MA}\xi_C {}^C\xi_M. \quad (1)$$

By transforming $^{MA}\xi_C$ and $^C\xi_M$ into $^{MA}\xi_M$, a problem based on an equation of the form AX=YB can be solved, where A and B are the relative transformations with respect to different coordinate systems. This is illustrated in FIG. 4, where an arrow between MA and C has been added. Thereby, the equation (1) can be re-written as:

$$R_{\xi_E} E_{\xi_M} = R_{\xi_{MA}} MA_{\xi_M}. \qquad (2)$$

Hence, in the equation AX=YB, A represents $^R\xi_E$, and B represents $^{MA}\xi_M$. X represents transformation $^E\xi_M$ and Y represents transformation $^R\xi_{MA}$, that both are unknown. These transformations (i.e. relations) are however constant over time, as it is assumed that the robot coordinate system R is fixed in relation to the MA coordinate system MA. X may be eliminated from the equation, and then only Y will be there to be solved, thus A'Y=YB'. In order to eliminate X, another pose (i.e. including another movement as previously explained) is needed, thus:

$$A_1 X = YB_1 \rightarrow X = A_1^{-1} YB_1 \qquad (3)$$

$$A_2 X = YB_2 \qquad (4)$$

Equations (3) and (4) give:

$$A_2(A_1^{-1} YB_1) = YB_2 \rightarrow A_2 A_1^{-1} Y = YB_2 B_1^{-1} \qquad (5)$$

and by exchanging $A_2 A_1^{-1} \rightarrow A'$ and $B_2 B_1^{-1} \rightarrow B'$, then an equation on the form A'Y=YB' is obtained, where X is eliminated. However, the equation with also X is considered more robust as it gives a more accurate result, see e.g. "Continuous hand-eye calibration using 3D points", Bjarne Grossmann et al, 2017, IEEE 15$^{th}$ International Conference on Industrial Informatics. The equation with also X is thus preferred.

In order to solve the equation, the robot 10 has to position itself in a plurality of different poses, as illustrated in FIG. 5 with $E_1$, E2 . . . , to get data for solving the equation. The movable apparatus 20 has also changed its position, this is however not required by the method. Thus, A and B in the equation AX=YB will change. When the robot 10 is positioned, it also simultaneously positions the marker 16, even though the pose of the marker 16 in the reference location coordinate system E may be unknown (however, it is fixed). In other words, the method comprising positioning S10 the marker 16 in a plurality of different poses in relation to the robot coordinate system R. This is typically performed by positioning the reference location E in the plurality of different poses. The relation E↔M between the reference location coordinate system E and the marker coordinate system M is typically unknown at the beginning of the method. In some embodiments, it is not necessary that the robot 10 is standing still in the different poses. Thus, the positioning S10 may comprise continuously or continually re-positioning the marker 16. In this scenario, the data streams from the robot 10 and the movable apparatus 20 might have to be synchronized.

For each pose of the plurality of different poses of the marker 16, a plurality of steps is performed.

These steps include determining S12, on the basis of sensor information, a relation C↔A between the sensor coordinate system C and a marker coordinate system M. The sensor information is captured or recorded by the sensor device 22 on the movable apparatus 20 and comprises information of the marker 16. In some embodiments, the sensor device 22 is a camera sensor device, and the method comprises capturing S11 one or several images of the marker 16, wherein the sensor information comprises image information from the one or several captured images. From the image information, the marker 16 is detected by image processing. Its pose in the sensor coordinate system C is for example determined using the perspective n-point problem, as known to the skilled in the art, or any other pose estimation method. A detected (i.e. measured) pose has a translational component, e.g. an x, y and z offset (i.e. a position of the marker), and an orientation component, e.g. three Euler angles (to indicate the orientation of the marker). Thus, when the pose of the marker 16 is known in the sensor coordinate system C, then a relation C→M between the sensor coordinate system C and the marker coordinate system M can also be determined, referred to as transformation $^{C1}\xi_{M1}$, $^{C2}\xi_{M2}$ . . . . The step S11 is then performed before step S12. The image processing may also include a filtering step, for example using a Kalman filter, to remove effects of jitter to the sensor device 22, or capturing several images and use information of an average of the several images.

The method also comprises determining S13 a relation MA↔C between the MA coordinate system MA and the sensor coordinate system C. This step is performed to know where the movable apparatus 20 is in relation to the MA coordinate system MA. The relation may be provided by the localization mechanism 26. The localization mechanism 26 typically provides the pose of the sensor coordinate system C in the MA coordinate system MA, thus the relation MA→C, referred to as the transformation $^{MA}\xi_{C1}$, $^{MA}\xi_{C2}$ . . . in FIG. 5. S12 and S13 gives information or data to compute B.

The steps performed for each pose of the marker 16 also comprises determining S14 a relation R↔E between the robot coordinate system R and a reference location coordinate system E. This step comprises, for example, to obtain the pose of the reference location 14 in the robot coordinate system R, thus the relation R→E, from the robot controller 11. This step is also referred to as $^R\xi_{E1}$, $^R\xi_{E2}$ . . . in FIG. 5, and thus gives information or data for A. Thus, on each pose of the marker 16 that is detected, data of the pose of the reference location coordinate system E from the robot 10 is also collected. When the steps S12-S14 (and optionally S11) have been performed for the plurality of different poses, there is information retrieved both from the robot 10 and the sensor device 22 related to the marker 16. According to some embodiments, the plurality of different poses comprises at least three different poses with a movement in between the poses, wherein each movement's rotation axis is non-parallel to the previous one(s). For three different poses it is understood that two movements are used, thus, one movement between two different poses. However, "one movement" should not be understood as being limited to be a continuous movement, instead, the movement may be interrupted by halts or include one or several sub-poses etc. These sub-poses are used only as waypoints between two different valid poses, and the movement is then between the two different valid poses. In other words, the rotational axes in the different poses are different in the sense that each rotational axis is non-parallel to any of the other rotational axes in the different poses. Thereby, there will be enough information or data to get a reliable result from the method. The accuracy of the method may be enhanced by using more poses than three, for example four, five, six, seven, eight, nine, ten, twenty or more different poses. Different methods for solving the hand-eye equation may also require different minimum amounts of poses. In one example using a dual quaternion solver for solving the hand-eye equation, three different poses with two movements in between having non-parallel rotation axes were used. In other examples using a Kronecker product for solving the hand-eye equation, five or more poses were used with corresponding movements in between the poses. In some embodiments, the plurality of different poses comprises at least three different poses, wherein at each of the at least three different poses the relative orientation between the robot coordinate system R and the reference location coordinate system E is different.

With a relation that is denoted with a double arrow "↔" is here meant a relation in either way. For example, the relation MA↔C, could mean either a pose of the sensor coordinate system C in the MA coordinate system MA, thus the relation MA→C (thus the transformation that brings MA to C), or a pose of the MA coordinate system MA in the sensor coordinate system C, thus the relation MA←C (thus the transformation that brings C to MA).

The steps S12-S14, and optionally step S11, are typically synchronized in time in order to retrieve information of the same pose of the marker 16, both from the robot 10 and from the movable apparatus 20. For example, the robot controller 11 may communicate to the moveable apparatus 20 when the marker 16 is in a predetermined pose. The poses may be dictated from the movable apparatus 20. However, it may be difficult to fully synchronize the data streams from the different sources. Synchronization methods may then be used to synchronize the data streams, such as described in "CHESS—Calibrating the Hand-Eye Matrix With Screw Constraints and Synchronization", Krittin Pachtrachai et al, IEEE Robotics and automation letters, vol. 3, no. 3, July 2018. After step S14, the method may check S15 if there are more poses to accomplish. If yes, the method returns to step S10 again. If not, the method continues to step S20. However, the method may use other criteria to decide when to stop returning to S10. In some embodiments, the method does not return to S10 when a predetermined accuracy has been reached, or when no more improvement in accuracy is accomplished (within a margin), or when a predetermined maximum accuracy has been reached. This check can be performed when also step S20 has been performed and there thus is a result of the calibration. The accuracy may be determined using a residual error of a least square fitting, as known to the skilled person. If the accuracy is not sufficient, the method returns to step S10 to get more data. In one example to determine the accuracy of the calibration, the coordinate axes of the robot coordinate system R are projected on a screen of the movable apparatus 20 in the MA coordinate system MA. The operator may then visually determine the accuracy of the calibration by comparing the placement of the coordinate axes with the localization of the robot. Of course, the coordinate axes of any other coordinate system of the robot may be projected on the screen for comparison with the actual robot.

In one example scenario, the movable apparatus 20 commands the robot controller 11 to move the robot's reference location coordinate system E to a new valid pose. The robot controller 11 will notify the movable apparatus when the reference location coordinate system E has arrived to this new valid pose by sending all necessary pose data to the movable apparatus 20. These steps correspond to step S10 and S14 of the method. The movable apparatus 20 will now start to capture image information until the movable apparatus 20 has a successful recognition of the marker 16. When the movable apparatus 20 has determined a successful image, it will stop the image capturing process. These steps correspond to step S12 of the method. The procedure is repeated for as many new valid poses as necessary, to get enough valid data. Data and commands between the robot controller 11 and the movable apparatus 20 may be communicated on a wireless link, for example using a router connected to the robot controller 11. The data and commands may be communicated using Web sockets and digital I/O supported by the robot controller 11.

Thus, after repeating the steps S12 to S15 for a plurality of poses, optionally also step S11, the method comprises determining S20 the relation R↔MA using the relation C↔M, the relation MA↔C, and the relation R↔E, in the plurality of different poses. As previously explained, the determining may use a hand-eye equation to model the problem. In order to do that, in some embodiments, the determining S20 the relation R↔MA comprises obtaining a relation MA↔M between the MA coordinate system MA and the marker coordinate system M, by using the relation MA↔C and the relation C↔M. The obtaining may include different methods for composing the relation (i.e. transformation) R↔MA, depending on how the relations are expressed. For example, the obtaining may include to compose the relation R↔MA using matrix multiplication, upon the relation MA↔C and the relation C↔M are expressed as matrixes.

The hand-eye equation used for modelling the problem is for example the equation $A_iX=YB_i$, where different indexes i represent different poses. In order to solve the equation, different methods may be used. The hand-eye equation may be represented for example using quaternion representation or Kronecker product representation. In one example, to solve the equation for Y, the equation $A_iX=YB_i$ is split into two parts (6), (7) where the relations are expressed in their matrix transformation form:

$$R_A R_X = R_Y R_B \qquad (6)$$

$$R_A t_X + t_A = R_Y t_B + t_Y \qquad (7)$$

The equation (6) is the rotation equation, and the equation (7) is the translational equation. $R_A$ is the rotation matrix of A, $R_X$ is the rotation matrix of X, $R_Y$ is the rotation matrix of Y, and $R_B$ is the rotation matrix of B. $t_X$ is the translation vector of X, $t_A$ is the translation vector of A, $t_B$ is the translation vector of B, and $t_Y$ is the translation vector for Y. The equations may be solved together, the rotation equation (6) may be solved first, or only the translation equation (7) may be solved, as only $R_Y$ and $t_Y$ may have to be determined, see e.g. "Continuous hand-eye calibration using 3D points", Bjarne Grossmann et al, 2017, IEEE 15th International Conference on Industrial Informatics. The equations may also be solved approximately to a minimal solution using optimization.

The method may be automatically performed, and thus does not need any human intervention. Thus, in some embodiments, the method comprises automatically performing the steps of the method. The robot 10 may then be programmed to move to the plurality of poses, or instructed to move to the poses by the movable apparatus 20, according to a computer program. Images or information of the marker 16 may then automatically be collected or captured, in synchronization with the positioning of the robot 10.

The result of the method is the relation R↔MA. The robot 10 and the movable apparatus 20 are now calibrated together and could be used together for different purposes. The transformation between the robot and the movable apparatus 20 is now known and calibrated. Positional and orientation data from the moveable apparatus 20 can now be transformed into the robot coordinate system R, and vice versa.

The relation R↔MA may be used for a plurality of purposes. For example, the method comprises using S30 the determined relation R↔MA for projecting augmented information related to the robot 10 on the display 23. For example, projecting safe zones of the robot 10 on the display 23.

The disclosure also related to a control arrangement 30 for determining a relation R↔MA between a robot coordinate system R of a robot 10 and a MA coordinate system MA of a moveable apparatus 20. The control arrangement 30 is configured to perform any of the steps of the herein described method. Thus, the control arrangement is configured to position the marker 16 in a plurality of different poses in relation to the robot coordinate system C. For each pose of the plurality of different poses, the control arrangement 30 is configured to determine, on the basis of sensor information, a relation C↔M between the sensor coordinate system C and a marker coordinate system M, determine a relation MA↔C between the MA coordinate system MA and the sensor coordinate system C, and to determine a relation R↔E between the robot coordinate system R and a reference location coordinate system E. The control arrangement 30 is also configured to determine the relation R↔MA using the relation C↔M, the relation MA↔C, and the relation R↔E, in the plurality of different poses.

The disclosure also related to a movable apparatus 20 for determining the relation R↔MA. The movable apparatus then comprises a control arrangement 30 as previously described. In some embodiments, the movable apparatus 20 is configured to obtain the relation R↔E from a robot controller 11 of the robot 10.

The disclosure also relates to a system 40 for determining the relation R↔MA. The system 40 comprises the robot 10, the movable apparatus 20, and the control arrangement 30 as described herein.

The invention claimed is:

1. A method for determining a relation R↔MA between a robot coordinate system (R) of a robot and a moveable apparatus coordinate system (MA) of a moveable apparatus, the movable apparatus comprising a sensor device and a localization mechanism configured to localize a sensor coordinate system (C) of the sensor device in the moveable apparatus coordinate system (MA), wherein a marker is arranged in a fixed relation with a reference location on the robot, the method comprising:
   positioning the marker in a plurality of different poses in relation to the robot coordinate system (R), and for each pose of the plurality of different poses:
      determining, on the basis of sensor information, a relation C↔M between the sensor coordinate system (C) and a marker coordinate system (M);
      determining a relation MA↔C between the moveable apparatus coordinate system (MA) and the sensor coordinate system (C) using the localization mechanism;
      determining a relation R↔E between the robot coordinate system (R) and a reference location coordinate system (E) of the reference location;
   determining the relation R↔MA using the relation C↔M, the relation MA↔C, and the relation R↔E, in the plurality of different poses.

2. The method according to claim 1, wherein said determining the relation R↔MA comprises obtaining a relation MA↔M between the moveable apparatus coordinate system (MA) and the marker coordinate system (M), by using the relation MA↔C and the relation C↔M.

3. The method according to claim 1, wherein a relation E↔M between the reference location coordinate system (E) and the marker coordinate system (M) is unknown at the beginning of the method.

4. The method according to claim 1, wherein the marker coordinate system (M) is immobile in relation to the reference location coordinate system (E).

5. The method according to claim 1, comprising automatically performing the steps of the method.

6. The method according to claim 1, wherein the moveable apparatus is a moveable augmented reality, AR, apparatus.

7. The method according to claim 1, wherein the sensor device is a camera sensor device, and wherein the method comprises, for each pose of the plurality of different poses:
   capturing an image of the marker, wherein the sensor information includes image information from the captured image.

8. The method according to claim 1, wherein the movable apparatus comprises a display, and wherein the method includes using the determined relation R↔MA for projecting augmented information related to the robot on the display.

9. The method according to claim 1, wherein the plurality of different poses comprises at least three different poses with a movement in between the poses, wherein each movement's rotation axis is non-parallel to the previous one(s).

10. A control arrangement for determining a relation R↔MA between a robot coordinate system (R) of a robot and a moveable apparatus coordinate system (MA) of a moveable apparatus, the movable apparatus includes a sensor device and a localization mechanism configured to localize a sensor coordinate system (C) of the sensor device in the moveable apparatus coordinate system (MA), wherein a marker is arranged in a fixed relation with a reference location on the robot, and the control arrangement is configured to:
   control the robot to position the marker in a plurality of different poses in relation to the robot coordinate system (R), and for each pose of the plurality of different poses:
      determine, on the basis of sensor information received from the sensor device, a relation C↔M between the sensor coordinate system (C) and a marker coordinate system (M);
      determine a relation MA↔C between the moveable apparatus coordinate system (MA) and the sensor coordinate system (C) received from the localization mechanism;
      determine a relation R↔E between the robot coordinate system (R) and a reference location coordinate system (E) of the reference location;
   determine the relation R↔MA using the relation C↔M, the relation MA↔C, and the relation R↔E, in the plurality of different poses.

11. A movable apparatus comprising:
the control arrangement according to claim 10; and
the sensor device and the localization mechanism configured to localize the sensor coordinate system (C) of the sensor device in the movable apparatus coordinate system (MA).

12. The movable apparatus according to claim 11, configured to obtain the relation R↔E from a robot controller of the robot.

13. A system comprising:
a robot including a marker, which is arranged in a fixed relation with a reference location on the robot;
a movable apparatus including a sensor device and a localization mechanism configured to localize a sensor coordinate system (C) of the sensor device in a moveable apparatus coordinate system (MA) of the moveable apparatus, and
a control arrangement for determining a relation R↔MA between a robot coordinate system (R) of the robot and the moveable apparatus coordinate system (MA) of the moveable apparatus, the control arrangement being configured to:
control the robot to position the marker in a plurality of different poses in relation to the robot coordinate system (R), and for each pose of the plurality of different poses:
determine, on the basis of sensor information received from the sensor device, a relation C↔M between the sensor coordinate system (C) and a marker coordinate system (M);
determine a relation MA↔C between the moveable apparatus coordinate system (MA) and the sensor coordinate system (C) receive from the localization mechanism;
determine a relation R↔E between the robot coordinate system (R) and a reference location coordinate system (E) of the reference location;
determine the relation R↔MA using the relation C↔M, the relation MA↔C, and the relation R↔E, in the plurality of different poses.

14. The method according to claim 2, wherein a relation E↔M between the reference location coordinate system (E) and the marker coordinate system (M) is unknown at the beginning of the method.

15. The method according to claim 2, wherein the marker coordinate system (M) is immobile in relation to the reference location coordinate system (E).

16. The method according to claim 2, comprising automatically performing the steps of the method.

17. The method according to claim 2, wherein the moveable apparatus is a moveable augmented reality, AR, apparatus.

18. The method according to claim 1, wherein the robot and the movable apparatus are calibrated together based on the relation R↔MA.

* * * * *